US011537978B1

United States Patent
Felstaine et al.

(10) Patent No.: US 11,537,978 B1
(45) Date of Patent: Dec. 27, 2022

(54) SYSTEM, METHOD, AND COMPUTER PROGRAM FOR INVENTORY MANAGEMENT UTILIZING AN INVENTORY AND TOPOLOGY MODULE INCLUDING A PLURALITY OF LAYERS

(71) Applicant: Amdocs Software Systems Limited, Dublin (IE)

(72) Inventors: Eyal Felstaine, Hertzeliya (IL); Ofer Hermoni, Yavne (IL); Guy Levi, Raananna (IL); Daniel Peretz, Hertzelia (IL); Martin John Crack, Penarth (GB); Shai Herzog, Ganei Tikva (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 847 days.

(21) Appl. No.: 14/673,602

(22) Filed: Mar. 30, 2015

Related U.S. Application Data

(60) Provisional application No. 62/014,005, filed on Jun. 18, 2014.

(51) Int. Cl.
*G06Q 10/08* (2012.01)
*G06Q 30/06* (2012.01)

(52) U.S. Cl.
CPC ....... *G06Q 10/087* (2013.01); *G06Q 30/0635* (2013.01)

(58) Field of Classification Search
CPC .................. G06Q 10/087; G06Q 30/0635
USPC ..................................................... 705/26.81
See application file for complete search history.

(56) References Cited

U.S. PATENT DOCUMENTS

| | | | | |
|---|---|---|---|---|
| 2011/0252420 A1* | 10/2011 | Tung | ............... | G06F 9/5072 718/1 |
| 2011/0295727 A1* | 12/2011 | Ferris | ............... | G06Q 30/04 709/224 |
| 2012/0131594 A1* | 5/2012 | Morgan | ............... | G06F 9/5072 718/105 |
| 2012/0147894 A1* | 6/2012 | Mulligan | ........... | G06F 9/45533 370/395.53 |

(Continued)

FOREIGN PATENT DOCUMENTS

| | | | |
|---|---|---|---|
| CN | 102801792 A | * | 11/2012 |
| CN | 103825779 A | * | 5/2014 |

OTHER PUBLICATIONS

Mell et al. "The NIST Definition of Cloud Computing" Sep. 2011 https://nvlpubs.nist.gov/nistpubs/Legacy/SP/nistspecialpublication800-145.pdf (Year: 2011).*

(Continued)

*Primary Examiner* — Matthew E Zimmerman
*Assistant Examiner* — Thomas Joseph Sullivan
(74) *Attorney, Agent, or Firm* — Zilka-Kotab, P.C.

(57) ABSTRACT

A system, method, and computer program product are provided for inventory management. In use, at least one order associated with a customer is identified, the order including an order of at least one service. Additionally, the at least one order is decomposed into one or more elements. Further, an infrastructure inventory layer is queried for the one or more elements. In addition, the one or more elements are allocated to the customer and the elements are marked as allocated in a local inventory repository. Furthermore, a service inventory layer is updated based on the allocation of the elements.

6 Claims, 12 Drawing Sheets

(56) References Cited

U.S. PATENT DOCUMENTS

| | | | | |
|---|---|---|---|---|
| 2012/0290460 | A1* | 11/2012 | Curry, Jr. | H04L 41/5029 |
| | | | | 705/37 |
| 2013/0247136 | A1* | 9/2013 | Chieu | G06F 21/577 |
| | | | | 726/1 |
| 2014/0075034 | A1* | 3/2014 | Vasudevan | H04L 47/70 |
| | | | | 709/226 |
| 2014/0095693 | A1* | 4/2014 | Apte | H04L 67/535 |
| | | | | 709/224 |
| 2014/0282536 | A1* | 9/2014 | Dave | G06F 3/04842 |
| | | | | 718/1 |

OTHER PUBLICATIONS

Yazir, Yagiz, et al., "Dynamic Resource Allocation in Computing Clouds using Distributed Multiple Criteria Decision Analysis", Jul. 2010, IEEE 3rd International Conference on Cloud Computing (Year: 2010).*

Beloglazov, Anton, et al., "Energy-aware resource allocation heuristics for efficient management of data centers for Cloud computing", May 2012, Future Generation Computer Systems vol. 28, Issue 5 (Year: 2012).*

Wo, Tianyu, et al., "Overbooking-Based Resource Allocation in Virtualized Data Center", Apr. 2012, IEEE 15th International Symposium on Object/Component/Service-Oriented Real-Time Distributed Computing Workshops (Year: 2012).*

Dutreilh, Xavier, et al, "Using Reinforcement Learning for Autonomic Resource Allocation in Clouds: Towards a Fully Automated Workflow", 2011, ICAS 2011, The Seventh International Conference on Autonomic and Autonomous Systems (Year: 2011).*

* cited by examiner

SYSTEM, METHOD, AND COMPUTER PROGRAM FOR INVENTORY MANAGEMENT UTILIZING AN INVENTORY AND TOPOLOGY MODULE INCLUDING A PLURALITY OF LAYERS

CLAIM OF PRIORITY AND RELATED APPLICATIONS

This application claims the benefit of U.S. Provisional Application No. 62/014,005, filed Jun. 18, 2014, the entire contents of which are incorporated herein by reference.

FIELD OF THE INVENTION

The present invention relates to inventory management, and in particular to managing inventory across various systems.

BACKGROUND

In the context of inventory management, the fundamental design challenges associated with managing inventory in a new, more virtual environment are based on the attributes of that emerging environment, such as a dynamic inventory, a hybrid dynamic and more static inventory, high volumes of data, service view requirements, multiple management systems in the landscape, automated and intelligent orchestration, and various other attributes. This applies to inventory management in the context of conventional networks and Network Function Virtualization based networks.

There is thus a need for addressing these and/or other issues associated with the prior art.

SUMMARY

A system, method, and computer program product are provided for inventory management. In use, at least one order associated with a customer is identified, the order including an order of at least one service. Additionally, the at least one order is decomposed into one or more elements. Further, an infrastructure inventory layer is queried for the one or more elements. In addition, the one or more elements are allocated to the customer and the elements are marked as allocated in a local inventory repository. Furthermore, a service inventory layer is updated based on the allocation of the elements.

DETAILED DESCRIPTION

Figure 1:
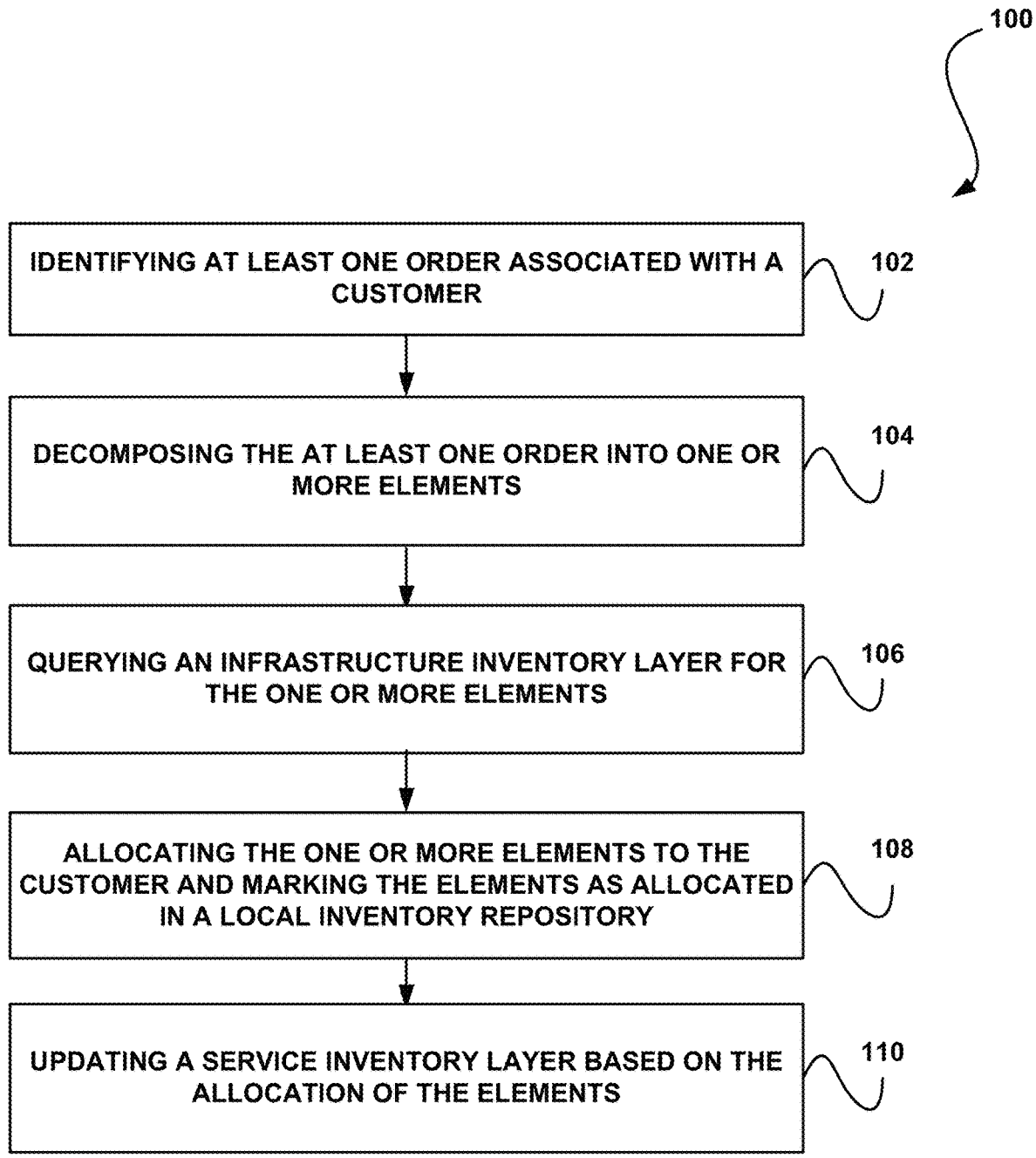
FIG. 1 illustrates a method for inventory management, in accordance with one embodiment.

FIG. 1 illustrates a method 100 for inventory management, in accordance with one embodiment.

As shown, at least one order associated with a customer is identified, the order including an order of at least one service. See operation 102. Additionally, the order is decomposed into one or more elements. See operation 104.

Further, an infrastructure inventory layer is queried for the one or more elements. See operation 106. In addition, the elements are allocated to the customer and the elements are marked as allocated in a local inventory repository. See operation 108.

The elements may represent services or resources in various embodiments. For example, in one embodiment, decomposing the order into one or more elements may include decomposing the at least one service into one or more services. In this case, decomposing the order into one or more elements may further include decomposing the one or more services into one or more resources. In another embodiment, decomposing the order into one or more elements may include decomposing the at least one service into one or more resources. In other words, an order may be decomposed into a service, and the service may be decomposed into resources or sub-services (which may be further decomposed into resources). In either case, querying the infrastructure inventory layer for the one or more elements may include querying the infrastructure inventory layer with one or more resources.

Furthermore, a service inventory layer is updated based on the allocation of the elements. See operation 110.

In one embodiment, the infrastructure inventory layer may communicate with a plurality of systems to obtain current inventory status information. As an example, the systems may include one or more of a cloud management system, a network, an OSS, or a physical inventory database.

Additionally, in one embodiment, the service inventory layer may function as a single point to view and maintain dynamic relationships between customers and assigned network services or resources. Further, the infrastructure inventory layer and the service inventory layer may be are part of an inventory module. As an option, the inventory module may maintain a holistic view of dynamic relationships between services, accounts, and subscribers. Further, the inventory module may function to synchronize relevant inventory elements and attributes with a centralized catalog.

It should be noted that the method 100 applies to inventory management in the context of conventional networks and Network Function Virtualization based networks.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
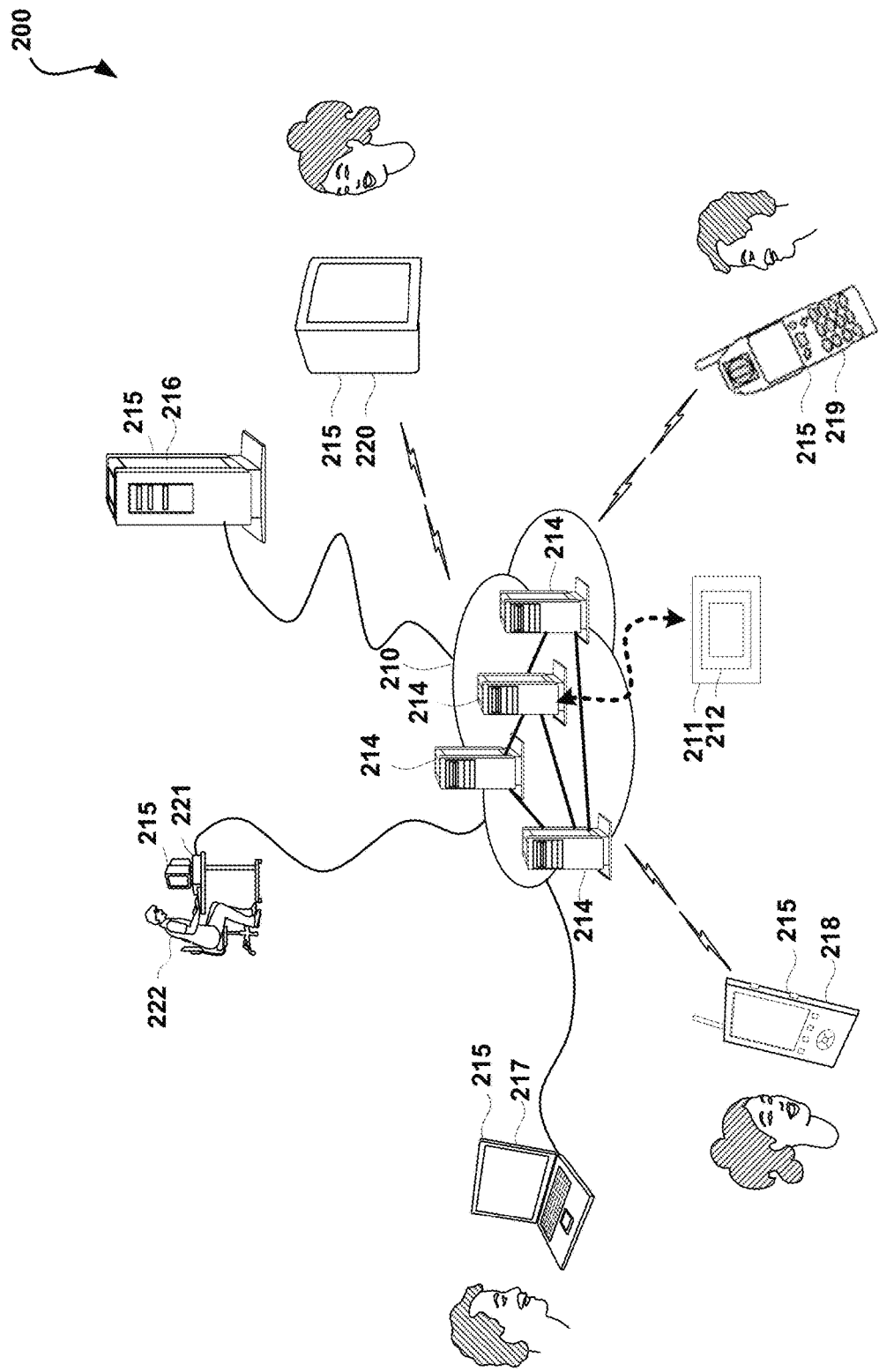
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, and an NFV-orchestration (NFV-O) module 212, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.)2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, and the NFV-O 212.

Figure 3:
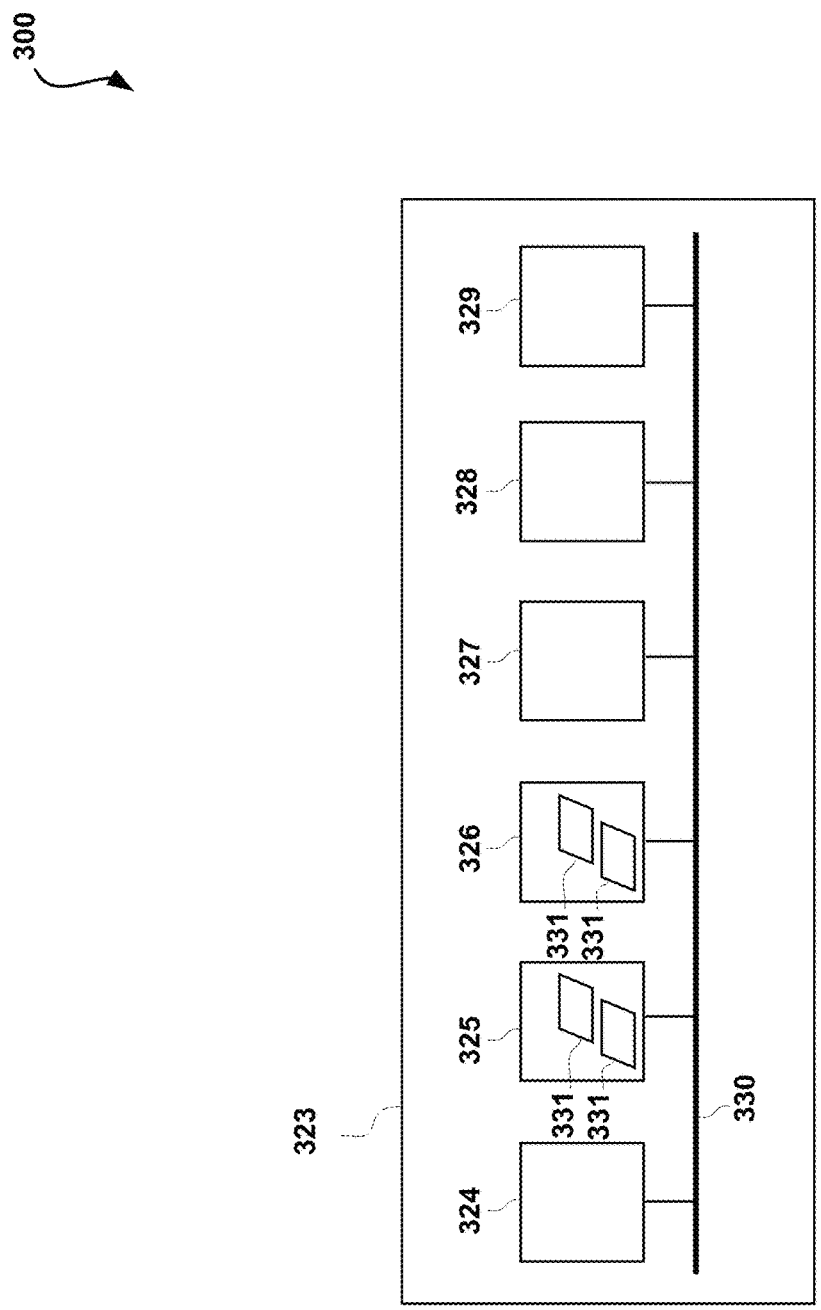
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, and the NFV-O 212 of FIG. 2.

Figure 4:
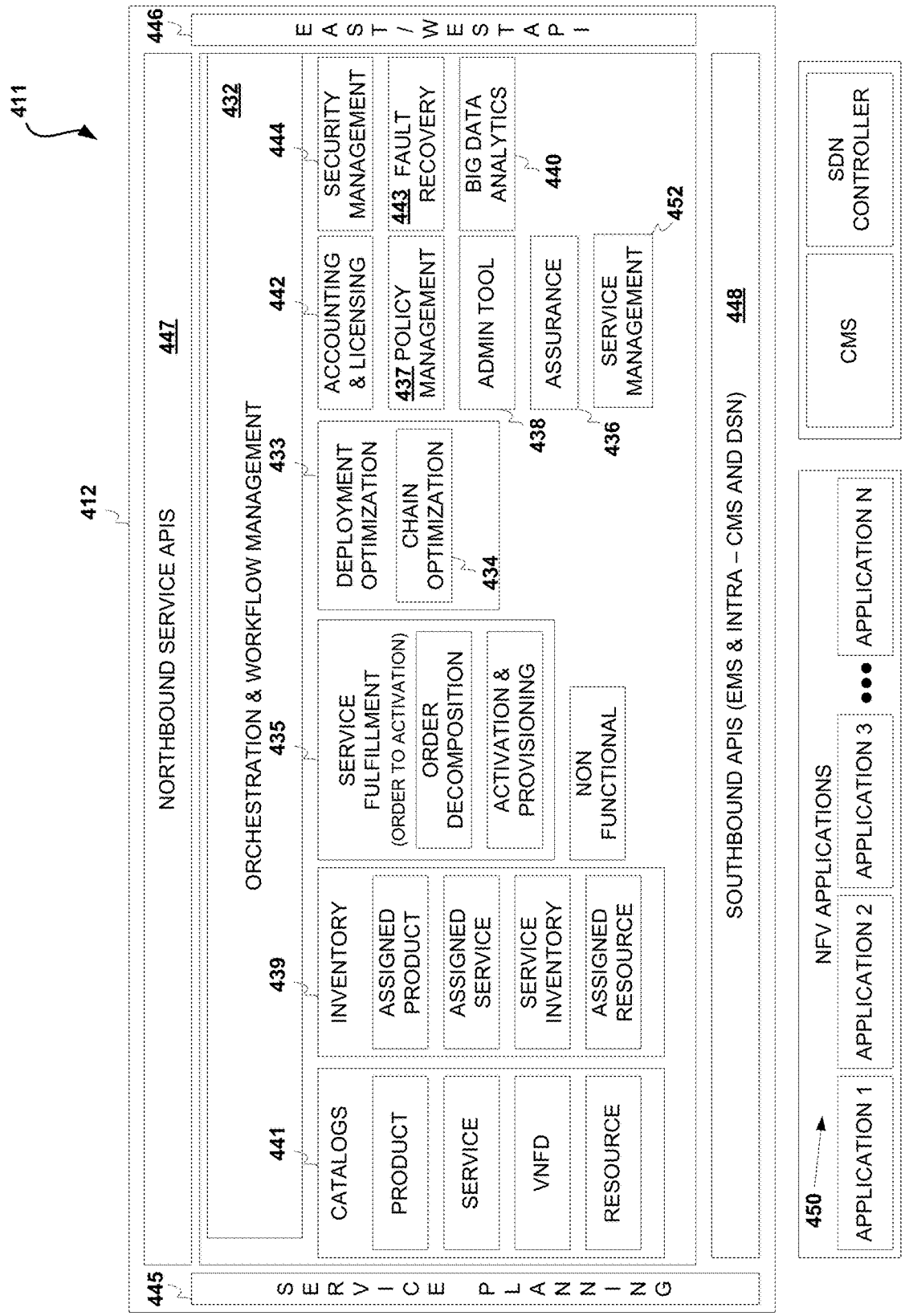
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfilment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfilment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
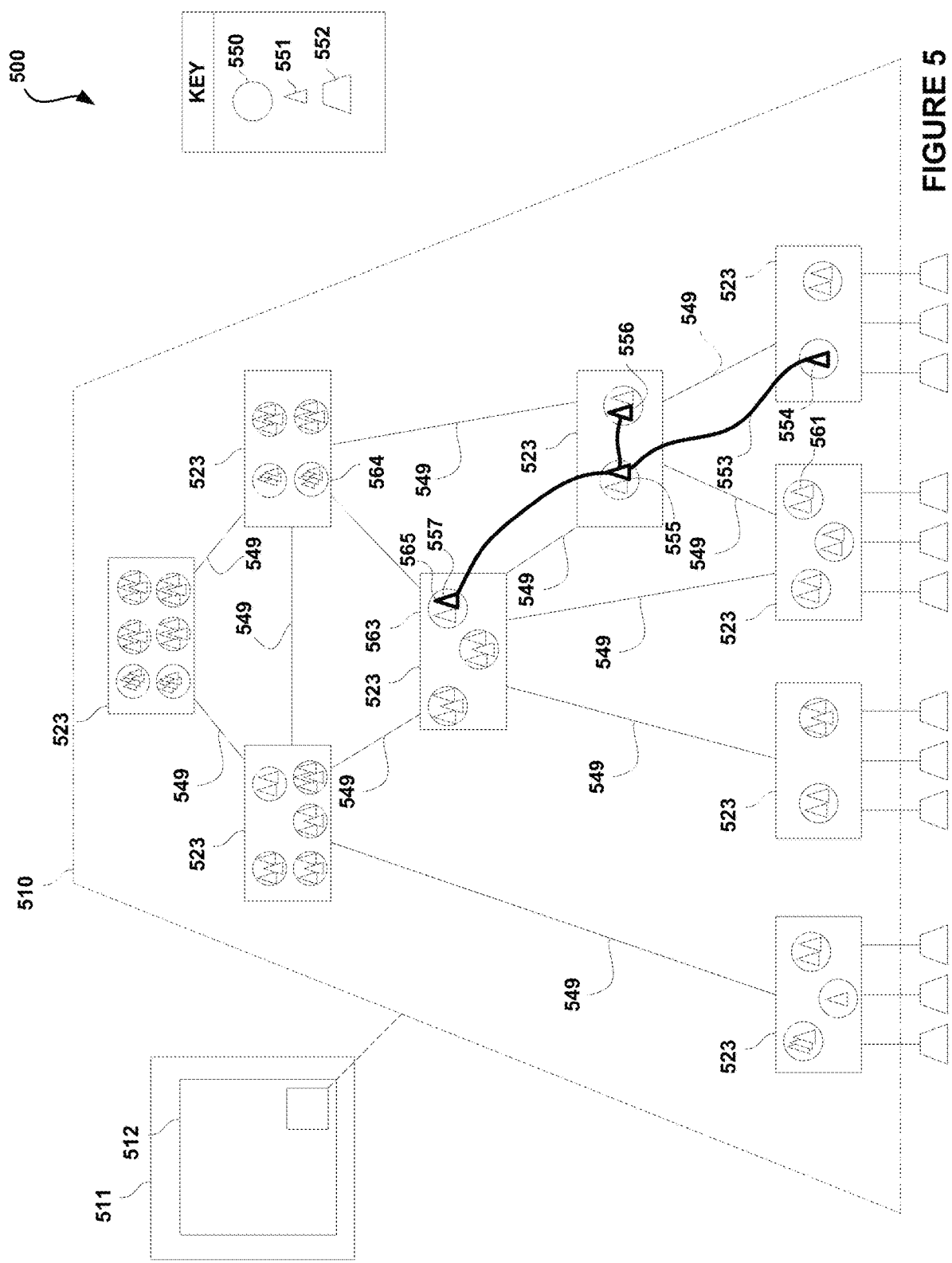
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, and an NFV-orchestration (NFV-O) 512.

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
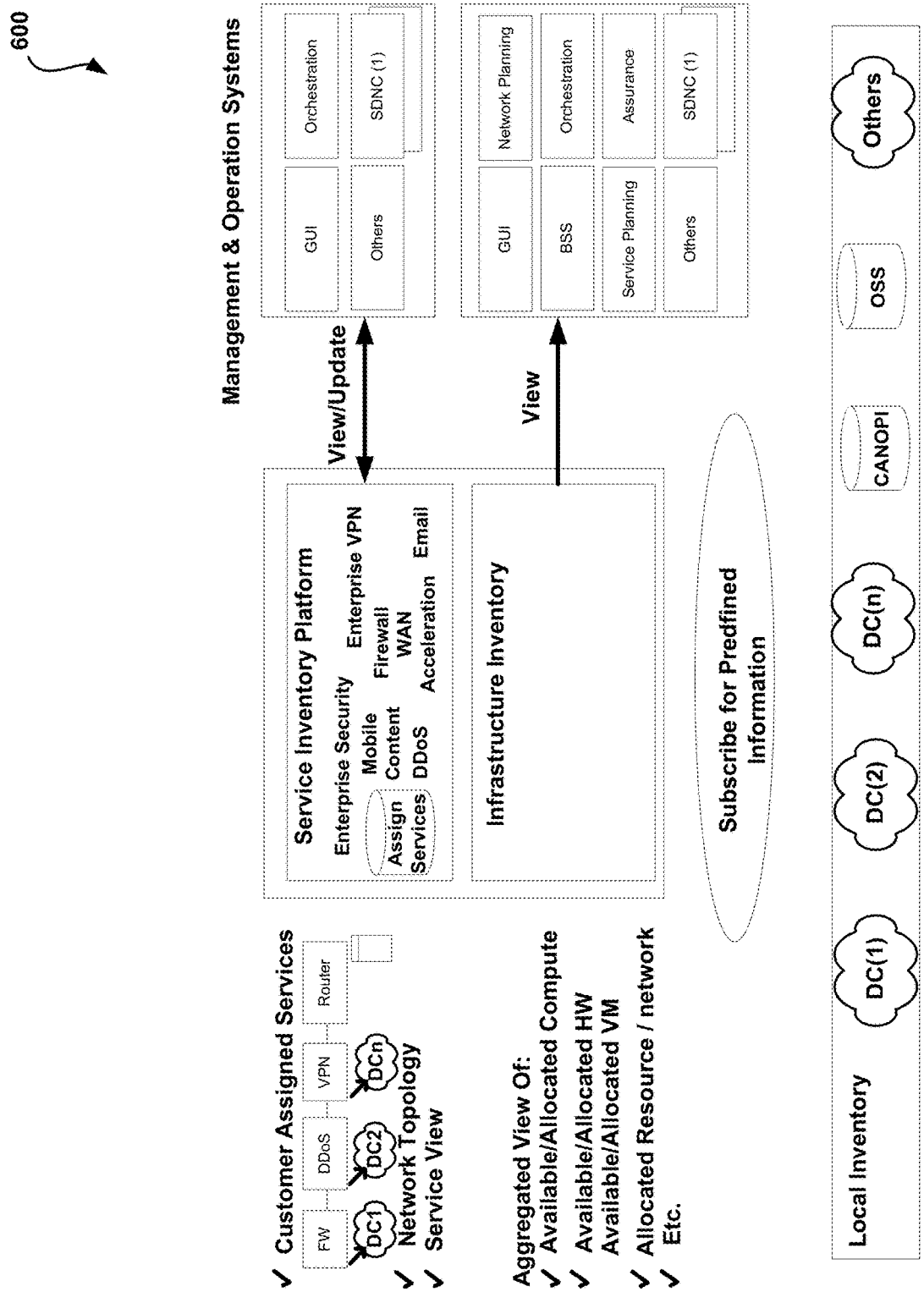
FIG. 6 illustrates a system for inventory management, in accordance with one embodiment.

FIG. 6 illustrates a system 600 for inventory management, in accordance with one embodiment. As an option, the system 600 may be implemented in the context of the details of the previous Figures. Of course, however, the system 600 may be implemented in the context of any desired environment. Further, the aforementioned definitions may equally apply to the description below.

As shown, the system 600 utilizes an active inventory as a single master inventory that can be deployed in a company's cloud and provide a real-time, up-to-date holistic network (virtual and physical) inventory view to support various functions and enable the management and operation processes. The inventory and topology module contains two main layers, an infrastructure inventory layer, and a service inventory layer.

The infrastructure layer interfaces with various existing systems such as cloud management systems, networks, and physical inventory databases for ongoing inventory status information (e.g., available/allocated VMs, compute, storage, network etc.).

The service inventory layer is based on capabilities which include translating allocated inventory into services and providing a single point to view and maintain dynamic relationships between subscription/customer and assigned network services/resources (i.e., providing a service and product view, and a network topology view).

As one example of system operation, a customer may order a product (e.g. a "gold security product", etc.). The order will be captured via the self-service portal part of the BSS system. Once the order is logged into the ordering system it is moved to the orchestration system for fulfilment on the network.

Figure 7:
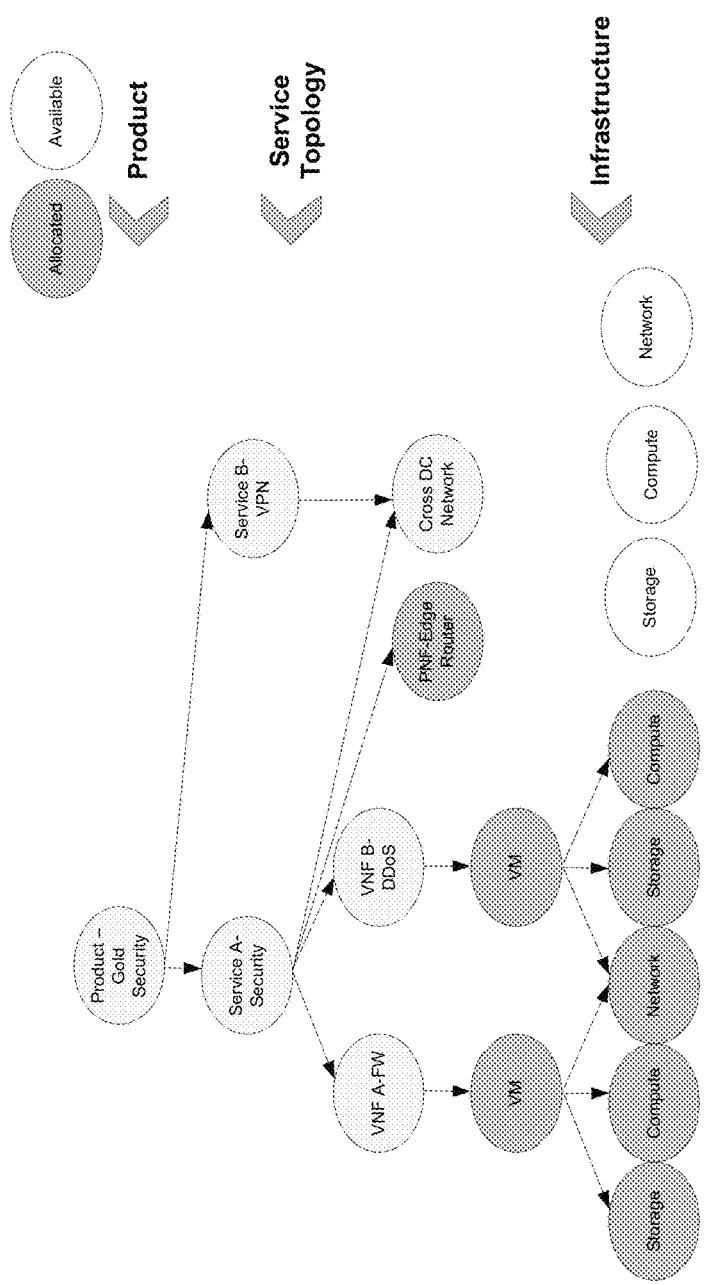
FIG. 7 illustrates an inventory logical layout, in accordance with one embodiment.

The orchestration system will decompose the order into the relevant network services elements (e.g. as illustrated in FIG. 7) which, in this example, includes Firewall, DDoS and VPN, using the centralized product catalog definition. Once the decomposition step is completed, the orchestration process will prepare the optimized deployment plan taking into consideration the relevant policies and customer criteria.

As part of this process, the orchestration will inquire the Infrastructure Inventory layer for the available resources: VMs, storage, compute, network, etc. Orchestration then executes the activation plan: initiate, configure, activate and connect the resources on the network. This will mark the resources as allocated in the local inventory repository (e.g. as illustrated in FIG. 7). Upon completion of the activation, the orchestration will update the Service Inventory layer with the customer assigned services: the order, customer and account information linked to the relevant resources.

FIG. 7 illustrates an inventory logical layout 700, in accordance with one embodiment. As an option, the layout 700 may be implemented in the context of the details of the previous figures. Of course, however, the layout 700 may be implemented in the context of any desired environment. Further, the aforementioned definitions may equally apply to the description below.

FIG. 7 shows an inventory logic layout in accordance with the above example of ordering a gold security product. With respect to the service topology, Service A-Security and Service B-VPN are connected via Edge Router (a physical device or PNF), while Service A contains two virtual functions VNF A—Firewall (FW) and VNF B—DDoS. Service B is network connectivity.

With respect to the infrastructure layer, VNF A—FW and VNF B—DDoS are each represented by one VM with storage, compute and network connections between them marked as allocated.

The inventory solution implements an aggregated inventory view rather than a silo embedded inventory view. The local inventory will be the master of its full inventory information while the aggregated inventory modules will keep available processed information of the optimum inventory information required to support network management business process and operational activities. The Inventory module will be able to interface (e.g. via subscription) with various existing local inventories (virtualized and physical) using standardized, pre-defined, policy-driven criteria for various infrastructure inventory information.

The Inventory module will also maintain a holistic view of service/account/subscriber dynamic relationships. This Inventory approach is designed to support full alignment with the centralized product/service/resource catalog definition. All relevant network inventory elements and attributes will be introduced and synchronized with the centralized catalog during the onboarding process. The Inventory module will be able to support distributed architecture implementation to benefit inventory information availability while keeping the balance between latency and data accuracy.

Figure 8:
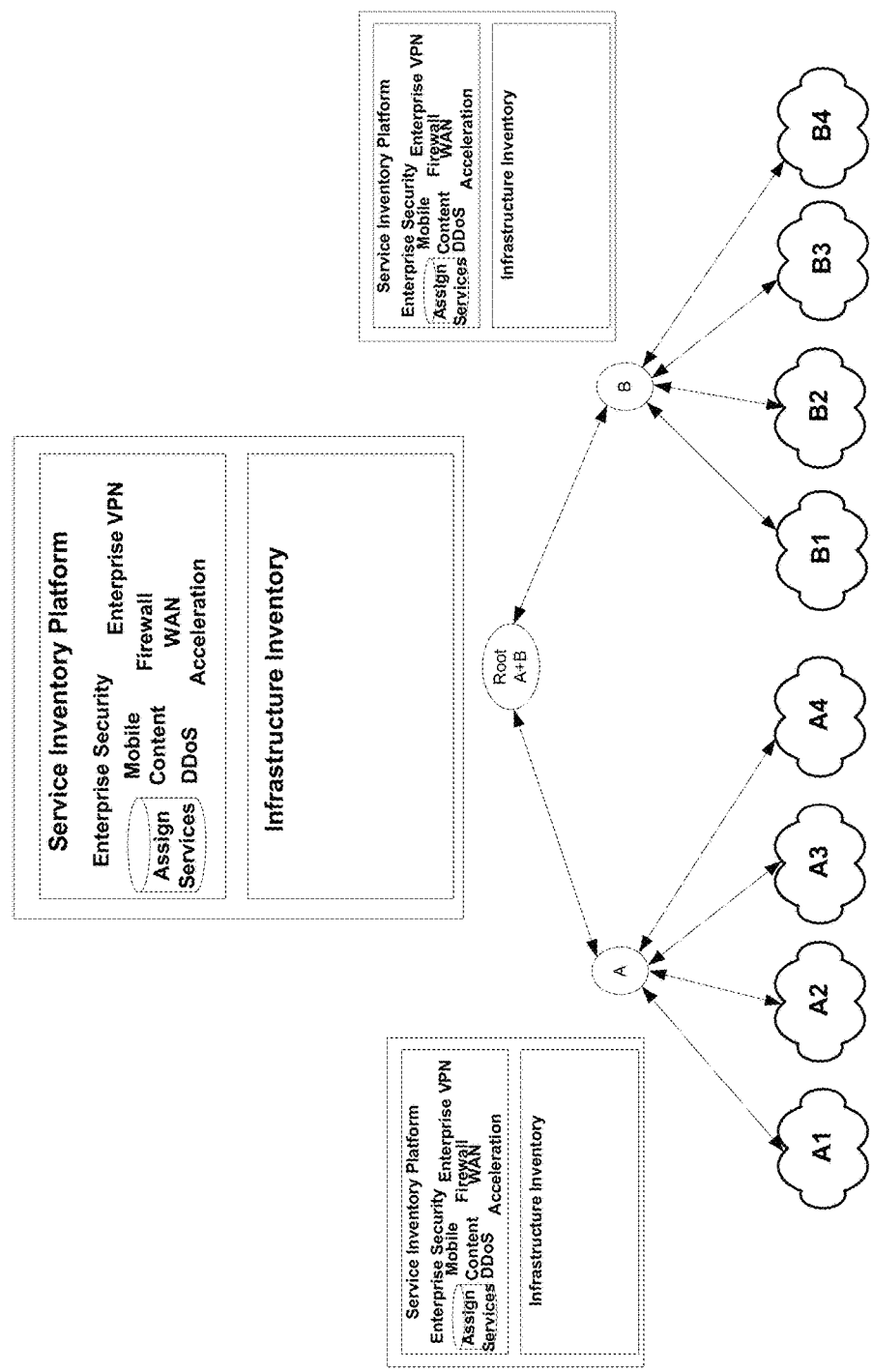
FIG. 8 illustrates an Inventory Topology Module distributed architecture, in accordance with one embodiment.

FIG. 8 illustrates an Inventory Topology Module distributed architecture 800, in accordance with one embodiment. As an option, the architecture 800 may be implemented in the context of the details of the previous figures. Of course, however, the architecture 800 may be implemented in the context of any desired environment. Further, the aforementioned definitions may equally apply to the description below.

Each level within the distributed architecture will possess the optimum information required to support the network management process. For example, the local data center, A1, will manage and keep real-time full inventory details for all inventory items within this data center (e.g., individual CPU usage and availability, storage availability for each device, etc.). The aggregated Inventory and Topology instances (Region A and Root) will maintain aggregated and summarized inventory information (such as: type of service, total CPU available, total DC usage, etc.) along with the account service dynamic relationships (service inventory layer) within their domain.

This architecture utilizes the locality concept in which local queries do not need to go up the chain, and cross-data center queries are made more efficiently. This approach is needed to assure the real-time transactional requirements that are required from the Inventory and Topology system.

The fundamental design challenges associated with managing inventory in a new, more virtual environment are based on the following attributes of that emerging environment, such as a dynamic inventory, hybrid dynamic and more static inventory, high volumes of data, service view requirements, multiple management systems in the landscape, automated, intelligent orchestration, and analytics.

With respect to a dynamic inventory, the need to retain a view of the current state of running services in order to manage them properly is a new requirement that requires a much tighter coupling of change and recording of change, such that a "current view" is available to all interested parties making management decisions. This is balanced with the need to limit the volumes of data exchanged and retained. The inventory solution described herein is intended to be configurable in order to optimize this balance right down to the individual service level where some services may be more closely monitored and detailed based on their profiles and associated policies.

With respect to hybrid dynamic and more static inventory, the combination of more and less dynamic inventories is a non-trivial challenge, particularly with the interdependencies involved. The different periodicities of change and speed of updating inventory means that at any point in time our view of an end-to-end service may not be current. The inventory solution described herein allows mastering of the data in whichever management module is responsible, and manages the federated/aggregated view of inventory accordingly. Orchestration of change will have to be managed across multiple management platforms and the aggregated view of the data should reflect its usefulness in dynamic decision-making. For instance, physical connectivity or reachability could not be dynamically re-configured in the same way as a virtual function which would make it a known constraint on the service rather than a dynamic metric.

With respect to high volumes of data, the new dynamic inventory will not only contain more data in terms of real-time status information but is going to need its relationships with disparate physical inventory items made explicit. The inventory solution described herein does not imply the consolidation of all this information with the volume, and therefore performance, implications that ensue. Instead the inventory solution retains inventory data as close as possible to its functional use and make that data available through mechanisms of federation, aggregation and dynamic relationships.

With respect to service view requirements, an end-to-end service view is required that spans multiple domains (physical, virtual, technological and regional) and this must also be dynamic in reflecting the elasticity inherent in the promise of virtualization. This view will be represented to the necessary detail in the Master Inventory and Topology which will facilitate links to each subservient inventory. This will enable greater drill down in the event that it is required by processes in the environment, while providing a necessary view of the end-to-end service.

With respect to multiple management systems in the landscape, existing to manage their silos of technology or geographical region cannot be practically consolidated into one whole. The transformation effort would impact our ability to take advantage of the benefits of virtualization. Instead, the inventory solution described herein allows each management platform (existing OSS, NFV-O, etc.) to master and control its own inventory because allowing cross-module updates would bring serious data integrity issues and/or require very complex integration and replication of process logic across many systems. A top level orchestration solution will manage each module's delivery of network service to create the whole, and the master inventory will retain an end-to-end view, necessary for its management, devolving tasks to the relevant systems for data retrieval, addition or update.

With respect to automated, intelligent orchestration, for virtualization to deliver flexibility and elasticity it must provide automated services, whether for fulfilment, operations or assurance purposes, and these services must have access to a near real-time view of the status of the environment so that policy-based but context-aware, machine-based decisions can be made about change. The inventory solution described herein, by providing the master view of inventory with optimal information for this purpose, minimizes the impact of the requirement while making this orchestration possible. It is even likely that individual service types will carry different data for this purpose based perhaps on their complexity, need for elasticity (change), age or maturity post-deployment, priority, type, usage, etc.

With respect to analytics, the solution will add a further impact on inventory data as the dynamic nature will increase the need to understand point-in-time views of the state of the environment and the services running within it. These views will be historic, but analytics will also want to generate future views for the purposes of planning. The inventory solution described herein will not utilize live inventory data in historic trending and future planning activities. Instead, the solution will take copies of data at definable intervals to definable levels of granularity in as light a touch as possible and make that data available in a separate environment for the purposes of planning analytics.

The inventory module may interact with various components of an architecture. For example, the inventory module may interact with a catalog that is a centralized, hierarchical information repository containing resource, service and product definition with their relationship, versioning, descriptors, etc.

The catalog is used to define the Resource template (define resource descriptors, attributes, activities, procedures, and connectivity) and Service template (define network service variation, policies, attributes, etc. using the resource building blocks). These definitions may be fulfilled during the onboarding process for each new resource/service, and enforced within the inventory as part of the resource/service lifecycle activities (e.g., instantiation, configuration, scaling, etc.).

The inventory module may also interact with orchestration, which is the main system responsible for managing (orchestrating) and executing all network orchestration processes. Orchestration of order and service decomposition and fulfillment flow including the VNF lifecycle workflow which includes deployment optimization, activation, and service lifecycle.

Deployment optimization optimizes VNF deployment over the virtualized infrastructure to meet traffic KPIs/SLA, cost, etc. for a specific service implementation. Typically, deployment optimization is initiated during two specific processes: order activation process and ongoing assurance activities (service movement due to failover). The deployment optimization will get information on resource and service availability, connectivity and topology information as input from the Inventory and Topology module.

Activation includes the orchestration of network activation of service into individual VNFs. The activation process will interact with the Inventory and Topology module in order to update, within the assigned services, the actual related services and resources location for the specific subscription.

Service Lifecycle includes managing service and resource instance lifecycle activities as part of the orchestration activities. This includes onboarding, initiation (instantiation), installation and configuration, scaling, termination, software update (of the running VNF), test environment, and rollback procedure. The activation process may interact with the Inventory and Topology module in order to update, within the assigned services, the actual related service and resource location for the specific subscription (termination, activation and scaling activities).

Assurance and Monitoring is responsible for monitoring and management of the overall network elements including data centers, connectivity, and services.

The Monitoring module is responsible for providing a view of the overall network. The Inventory and Topology module provides the ability to inquire network and service topology, view service and resource status, availability, and usage. The information can be aggregated in various methods: geographical location (data centers), service types, customers/subscriptions, resources types, etc.

The Assurance module is responsible for processes such as network optimization and failovers; once a trigger has been identified (e.g., usage threshold has reached) the Assurance module analyzes it and acts upon each incident according to the defined policy (e.g., scaling). The Assurance module interacts with the Inventory and Topology module to inquire network infrastructure (availability of resources, services, capacity, usage, etc.) to receive the required information to be analyzed. The Assurance module interacts with the Big Data Analytics Module to enrich operational policies.

Licensing and Accounting manages licensing and usage of virtual network applications and supports complex rating schemes based on various parameters such as CPU, memory, etc. The Licensing and Accounting functionality enables evaluation of the internal costs of provided services within the network for return on investment (ROI) calculation. The Licensing and Accounting functionality interacts with the Inventory and Topology module, enabling current and historic network information.

Big Data Analytics provides big data repository network information, enables generation and analysis of what-if scenarios to support business-oriented planning processes, and provides predictive behavior modeling to guide the system with regard to network capacity and service function scaling requirements. Big Data Analytics interacts with the Inventory and Topology module to receive network and service data to support network decisions in relation to service and subscriber. Also, analytics improves network performance based on actual usage patterns.

The Service Design and Creation module includes two main planning functions: service planning and network planning. The Service Planning module is an online planning and selling tool (for the service provider's sales representative, enterprise, and technician) which is part of the selling engagement process with enterprise/SMB customers. The Service Planning tool interacts with the catalog, customer data, ordering system and the Inventory and Topology module in order to retrieve the available services and resources and fulfil the plan.

Network Planning can use the Inventory and Topology module to obtain details regarding current inventory infrastructure and services such as usage, capacity, availability, etc.

The Inventory and Topology module may also communicate with network and cloud components to manage inventory.

Due to the dynamic nature of the virtual environment, inventory may need to be equally dynamic in terms of maintaining a viable view of the environment, while at the same time allowing individual management components to master and manage their own data inventories. As such, in one embodiment, the active inventory may be integrated via standard APIs to all interested management modules to a greater or lesser degree, depending upon their roles and north/south bound positions in the hierarchy. A policy of subscribe and publish, combined with policies and thresholds, may be adopted for managing the level of inventory data interchange between modules. Other management modules such as NMS and CMS may not update inventory directly but may notify the orchestration layer which will update the inventory accordingly.

Furthermore, various events may initiate updates of inventory items. For example, order events will update inventory items. This may include service creation such as the fulfillment of new orders from any northbound interface via Orchestration including customer portals, manual and automated order fulfilment. This may also include service modification to existing services already itemized in inventory (e.g. change service elements, add sub-service element, increase or decrease capacity, etc.).

A service cease, or the cessation of a service and subsequent deletion of its functional instances from the current inventory, may also cause an update of inventory items.

Additionally, operation events may also cause an update of inventory items. For example, an NFV-O system may be the master of the active inventory and will process all events prior to updates being made. This is done for the integrity of the entire data hierarchy. NFV-O may orchestrate changes to the underlying environment that require inventory updates upon the basis of operational events from other elements in the environment. Operational events may come from a number of sources but are of two kinds; alerts which instigate dynamic action on the part of the NFV-O and information for the benefit of maintaining active status records.

Southbound Events may also cause an update of the inventory and may come from any component of the virtual environment including but not limited to the CMS, EMS, VNFs, OSS, third parties, etc. and are likely to be filtered and aggregated before arriving at the NFV-O. Upon arrival, the NFV-O will, in conjunction with other events, defined policies, and the status of services (as recorded in the active inventory), dynamically request changes to services which it will then update within the inventory.

East/Westbound Events may also cause an update of the inventory. Fault Management Systems and Service Assurance from Network Management Systems may be processed by NFV-O and subsequently initiate updates to inventory. These could be direct responses to issues affecting the services defined or correlated logical side effects of changes to parallel services.

Additionally, faults propagated from any source may require the NFV-O to make dynamic changes and update the inventory.

Disaster Recovery and Resilience events that either invoke disaster recovery resources or have implications for the resilience of a service (e.g., loss on one half of a cluster) will be dynamically addressed by NFV-O, which will subsequently cause an update of the inventory.

Threshold Events may also cause an update to the inventory, whereupon the NFV-O will make changes to the environment (e.g., scaling).

Manual events may also cause updates to the inventory. This may be necessary for the performance of maintenance or testing in production such as changing the status of a service while undertaking an upgrade on a resource upon which it relies.

Additionally, alerting, usage, and/or reporting events may cause updates. Alerting events will also update the status of inventory items when a change is made by the NFV-O, but this category of updates is more targeted to maintaining the status of services recorded in the active inventory. As such, pre-defined metrics data will be collated from underlying modules in order to maintain a meaningful status for each service.

This may be on a push/pull, publish/subscribe or other basis. These events may be associated with metrics relevant to the health and status of the service to which they are ascribed, but are likely to be kept at a relatively high granularity for performance reasons. For example, they are likely to be about number of faults rather than fault details. It is anticipated that drill down mechanisms, either to other management modules or specific snapshot views of aggregated inventories will provide the detail as required by requesting systems.

Inventory items may be updated at the speed and frequency of the service/function involved, effectively in near real-time. This may be a variable for each, specified by policy in the service and function definition based on such aspects as priority, availability, product billing regime, business importance, dependencies of and on other services, etc. The top-level active inventory itself may be capable of being updated in seconds. Other associated entities may have different constraints for update, but NFV-O will orchestrate across systems to ensure a consistent inventory view.

As each management module of the virtualized and physical environments will be responsible for mastering and updating its own inventory data for integrity purposes, in one embodiment, different events may be propagated to NFV-O at different, and possibly poorly, ordered rates. NFV-O may be responsible for correlating received events and updating the active inventory accordingly. For instance, it may be acceptable in the case of a usage metric to wait on a second that allows for the update of a status whereas in the event of an alert it may be imperative that the status is updated to identify a threshold breach. This may be the case, for instance, to ensure processes can begin to resolve the problem by carrying out analytics while waiting for more data to arrive.

Due to the dynamic nature of the virtual environment, inventory may need to be equally dynamic in terms of maintaining a viable view of the environment while at the same time allowing individual management components to master and manage their own data inventories. As such, in one embodiment, the active inventory may be integrated via an API to all interested management modules to a greater or lesser degree, depending upon their roles and north/south bound positions in the hierarchy. A policy of subscribe and publish, combined with policies and thresholds, may be adopted for managing the level of inventory data interchange between modules.

With respect to point-in-time views of inventory, the solution may provide a comprehensive federated view of the present dynamic status of all services, functions and resources based on an "Assigned Service" attribute across all inventories participating in the virtual environment. This may facilitate drill down on the basis of: resource-facing attributes (e.g. topology, usage, technology/service/resource, location, function, etc.), service-facing attributes, service/customer view, and specific resource service, etc.

Access to past point-in-time views may be facilitated through the provision of snapshots of the present view being taken and stored, albeit with reduced levels of detail. Granularity, scope and time intervals for these views may be configurable by implementation and over time and instance to allow the balancing of management system resource capacity against need.

Future views may be created based on similar metrics by Analytics functions to generate generic and specific future views of inventory. These views may be utilized by analytics functions on more specific planning or "what-if" questions.

Inventory data may be utilized in a variety of ways. The uses for inventory data include but may not be restricted to capacity planning, ongoing fulfillment (e.g., SLA, Quality, etc.) feasibility, operational management, analytics "What If" scenarios, monitoring of service health and the ability to drill down, root cause analysis, resilience and disaster recovery planning and prediction, service performance analysis, service assurance, and/or billing, etc.

In the context of capacity planning, historic, current and future views of capacity maintained within inventory will be used by capacity planning functions to instigate network and infrastructure build, inform the deployment of services for fulfilment and enable analyses of network function usage to aid future vendor selection.

In the context of ongoing fulfillment (e.g., SLA, Quality, etc.) feasibility, fulfillment will use inventory to optimize deployment of functions based on the current and possibly predicted state of the environment. This may include feasibility analysis as well as establishing how to deploy new services based on policy and given potential choices presented by location, existing services and resource capacity.

In the context of operational management, all operations instigated for scaling, optimization, assurance, etc. will check inventory for current status and use this information together with policy and analytics for automated operational actions on functions within the environment. Changes will be updated within the inventory.

In the context of analytics "What If" scenarios, analytics will utilize past and present views of inventory to assess usage and other trends and additionally will use the data for generating future, possibly selective, views of inventory for the purposes of doing "what-if" analysis. For example, "What if I want to deploy new function A in location B in three months' time and the resource usage has continued to grow at the historical, or other, rate?"

In the context of monitoring of service health and the ability to drill down, it is anticipated that inventory will be the starting point for the monitoring of the health of services within the environment by acting as the identifier of the service being monitored. This allows the level of monitoring to be set within inventory either by policy or overridden for specific services. Alerts received by the NFV-O will also use the inventory to identify the service(s) affected and allow the drill down to other component parts for deeper analysis.

In the context of root cause analysis, as with monitoring, active inventory will be the start point for root cause analysis of issues affecting service including historic analysis.

In the context of resilience and disaster recovery planning and prediction, where resilience is provided by "n+n" type services, inventory will be vital in re-establishing resiliency in the event of failure in terms of starting up replacement services and adding them to the service chain. In the case of disaster recovery, not only will inventory be used as a reference point for the invocation of disaster recovery, but it will also be updated by resolution activities. In addition, it is anticipated that extensive "what-if" analysis will need to be performed by analytics to determine the potential end states created in the event of disaster. For instance, services in one location will have their contingency in multiple other locations; therefore, prior to any disaster, the revised topology and its feasibility needs to be understood in terms of infrastructure and network resource.

In the context of service performance analysis, historic active inventory data may be used to analyze the performance of services and their underlying functions. Function performance may inform future selection within the new paradigm of an open market place for virtual functions from many vendors. Cost of ownership analysis will play an important part in this and full lifecycle records will be required from historic views.

Service Assurance will use active inventory as one source of assurance events in which it is interested, pertaining to virtual resources. Upon any service issue from any source such as NFV-O, CMS, NMS, etc., Service Assurance will active inventory as a reference point for ASSIGNED SERVICE and therefore be able to drill down to contributing resources.

In the context of billing, while the NFV-O may pass usage data directly to northbound BSS and CEM systems, inventory will store at least aggregated summary data for use in reconciliation and trend analysis including TCO.

The Inventory technology is designed specifically to address the evolving needs of operating and managing virtual telecommunications networks. The Inventory maintains the information required for management and execution of all the services and the associated network functions on a dynamic, real-time basis. This information is derived from all layers of the User Defined Network Cloud (UDNC) architecture thereby requiring the information management system to support a wide variety of data formats. Furthermore, the Inventory needs to manage information creation, modification, use and release based on the dynamic changes and optimizations of all associated systems and layers of the UDNC. The need for accurate, up-to-date and synchronous views of underlying assets and resources in a highly dynamic environment means that a new information management paradigm is required to support both the performance and scale requirements of the UDNC.

As noted, the Inventory module may be divided into two layers: Infrastructure Inventory and Service Inventory. The module may be able to support distributed architecture modes where each node of inventory within the distributed architecture will maintain the optimum relevant information.

The Infrastructure Inventory layer will interface with various systems for ongoing inventory status information (e.g., available/allocated VMs, compute, storage, network, etc.). The Infrastructure Inventory may interface with the local inventories will be configurable, subscribing to pre-defined inventory information. For example, the Infrastructure Inventory may define that each local inventory database publish updates only when there are inventory (compute, storage, network, etc.) availability changes in pre-defined ranges (below 30%, 25%, etc.). This technique will enable the Infrastructure Inventory to maintain pre-defined, up-to-date, and holistic aggregated inventory information to support ongoing network management business process and operational activities. The Infrastructure Inventory will be able to publish specific information for various subscribed modules (e.g., orchestration, assurance, etc.) on top of the inventory inquiries abilities.

With respect to the Service Inventory, while the Infrastructure Inventory layer will be able to identify if an inventory item is allocated or available, the Service Inventory layer may provide a service and subscription relationships inventory view. The Service Inventory maintains each service link to the relevant inventory items in one direction, and to the relevant subscriptions/order in the other direction.

This dynamic relation will be updated by any system that will perform activities on those services' relevant order/subscriptions. For example, in the case of scaling/optimization activity that will change the relevant service location/topology, the orchestration will update the Service Inventory with the up-to-date inventory information for the specific service.

The inventory implementation (inventory layers in distributed architecture) will enable the required data availability, latency and correction. With respect to data availability and latency, the Inventory module provides queried data information very quickly by using the Infrastructure Inventory subscription mechanism. Infrastructure Inventory may subscribe to pre-defined relevant required information and keeps it available for all ongoing business process and activities.

For data correctness, the Inventory module aggregates inventory data from local inventory agents. This may be done by the Infrastructure Inventory layer subscribing to inventory updates; the definition of the data to be subscribed and the frequency of the updates are pre-configured and define the actual aging/correctness of the inventory data.

The Inventory module provides the flexibility to define dynamic frequency to balance between real-time data and the latency to provide such accuracy. For example (assuming 10% CPU inventory availability is crucial level), the Infrastructure Inventory will define with inventory agents to provide inventory CPU availability updates in pre-defined ranges (below 40%, 30%, 25%, 20%, 18%, 16%, etc.). This technique will enable the Infrastructure Inventory to maintain data aging that will not impact data correctness on one end and will not impact the latency on the other end.

Figure 9:
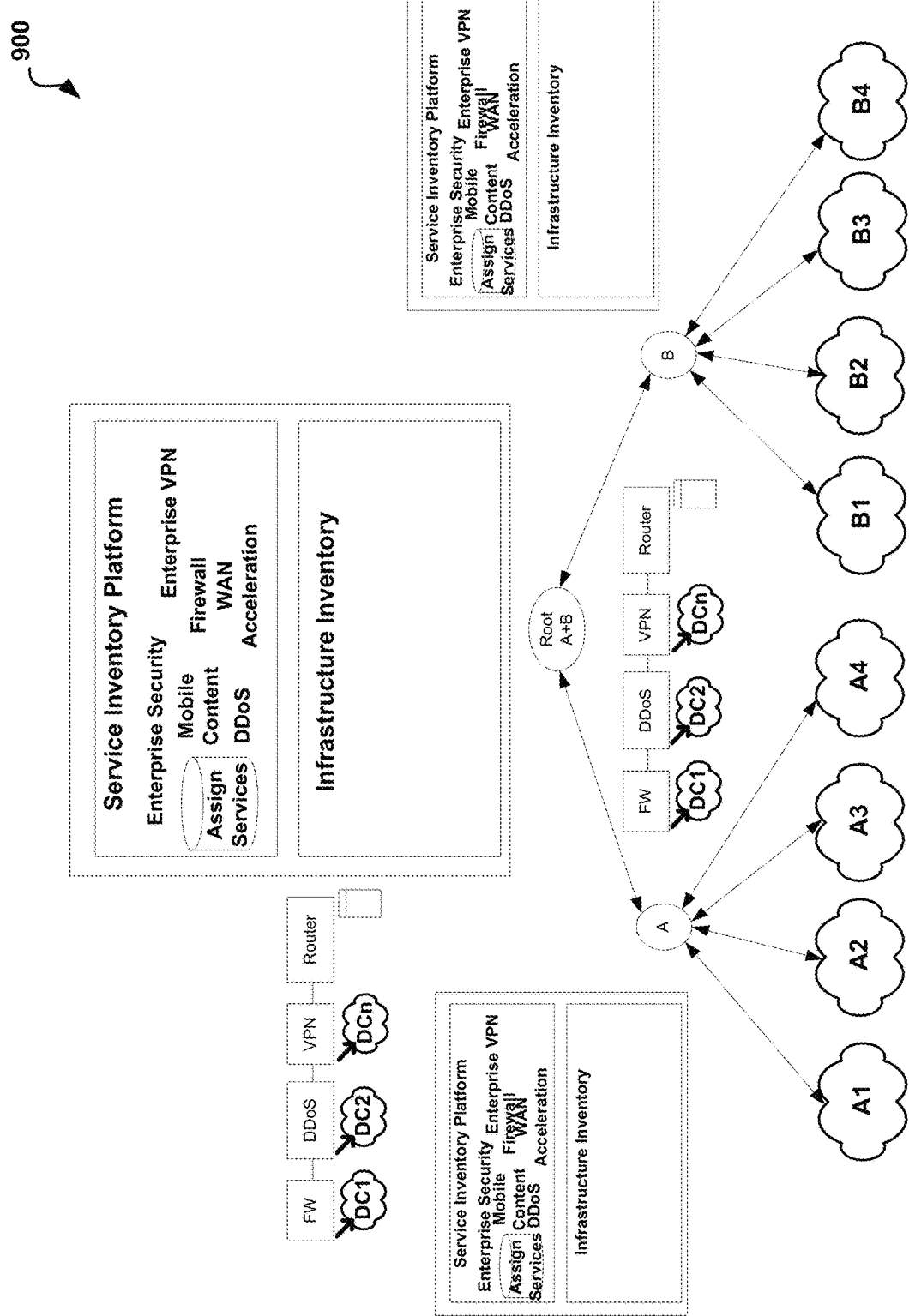
FIG. 9 illustrates an example showing a subscriber service relationship with single data center distribution, in accordance with one embodiment.

FIG. 9 illustrates an example 900 showing a subscriber service relationship with single data center distribution, in accordance with one embodiment. As an option, the example 900 may be implemented in the context of the details of the previous figures. Of course, however, the example 900 may be implemented in the context of any desired environment. Further, the aforementioned definitions may equally apply to the description below.

The example of FIG. 9 illustrates the provision of Gold Security Product to a customer. In this example the service as a whole was provisioned under Region A, aligned with customer criteria and network availability. The A1 Data Center maintains full security service information as part of the local inventory instance, the Region A Inventory and Topology database will maintain the subscriber to service relationship service graph, with pointers to the relevant data center location (A1 Data Center). The same information will also be maintained within the Root Inventory and Topology DB as an overall service view. So, this conveys a local view (data center A1), a regional view (Region A) and a master view (Root). If services relevant to the VNFs' locations and connections within the A1 Data Center are changed due to network and business processes (scaling or optimization), the relevant application will update the A1 Data Center inventory with the new availability and allocation, while the Region A and Root data center instance will be updated with the links of those VNFs as part of the service inventory layer.

Figure 10:
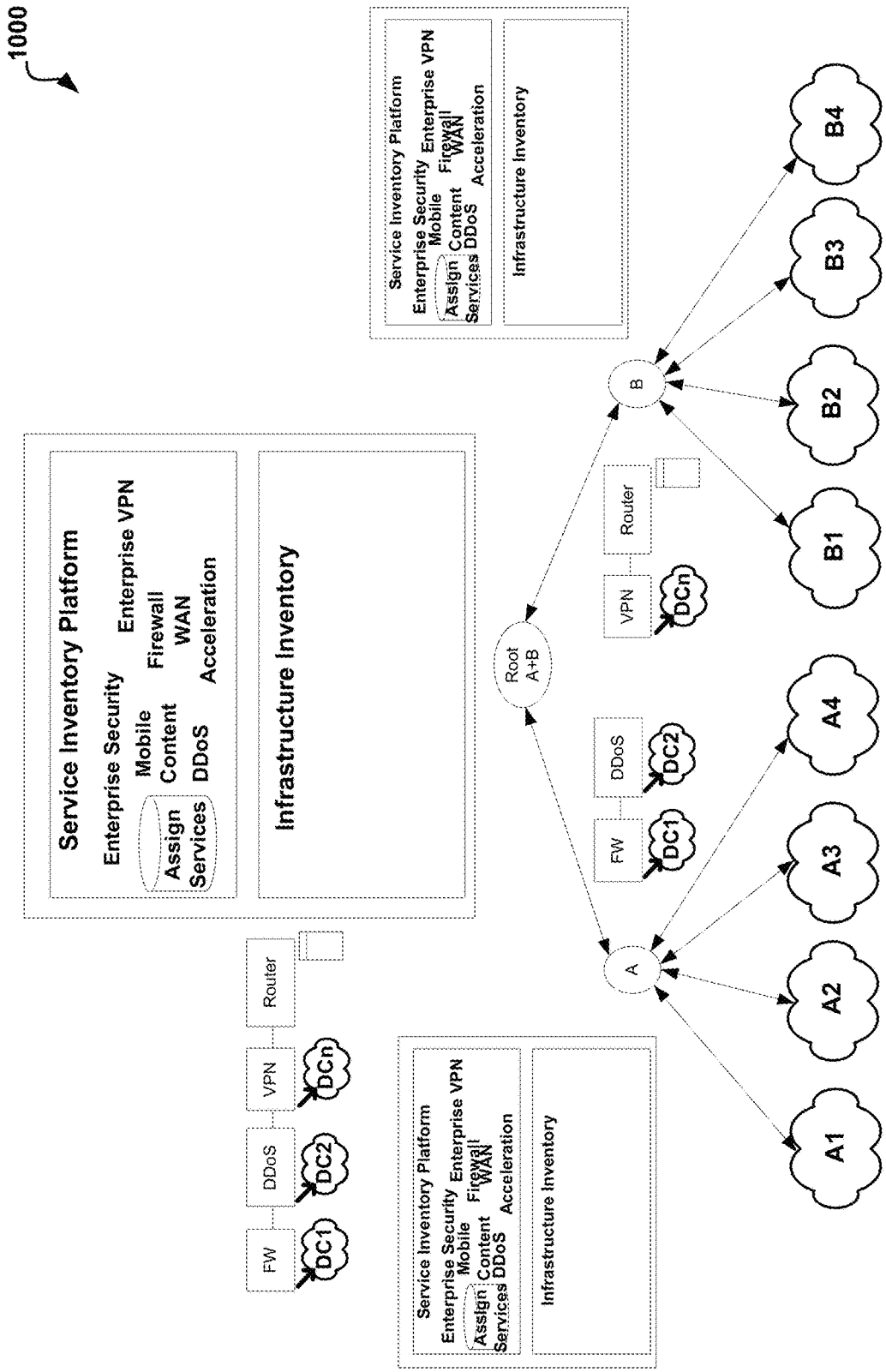
FIG. 10 illustrates an example showing a subscriber service relationship with cross data center distribution, in accordance with one embodiment.

FIG. 10 illustrates an example 1000 showing a subscriber service relationship with cross data center distribution, in accordance with one embodiment. As an option, the example 1000 may be implemented in the context of the details of the previous figures. Of course, however, the example 1000 may be implemented in the context of any desired environment. Further, the aforementioned definitions may equally apply to the description below.

FIG. 10 shows an example of the provision of Gold Security Product to a Customer across Region A (A1=FW and A2=DDoS), and Region B (B2=VPN, B3=Edge Router), each maintaining full security service information as part of the Inventory and Topology instance, while the Region A and Region B Inventory and Topology DB will maintain the subscriber to service relationship service graph, with pointers to the relevant data center location (A1, A2, B2, and B3 data centers). In this example, the Root Inventory and Topology DB will have the end-to-end service view while the Region A and B Inventory and Topology will have its local view of the service. If the VNFs location and connection within the A1, A2, B2, and B3 data centers are changed due to scaling or optimization network business processes, the infrastructure inventory availability and allocation updates will be reflected only in the A1, A2, B2, and B3 data centers' Inventory and Topology instance, while the Region A, Region B and Root data center instance will be updated with the links of those VNFs as part of the service inventory layer.

Figure 11:
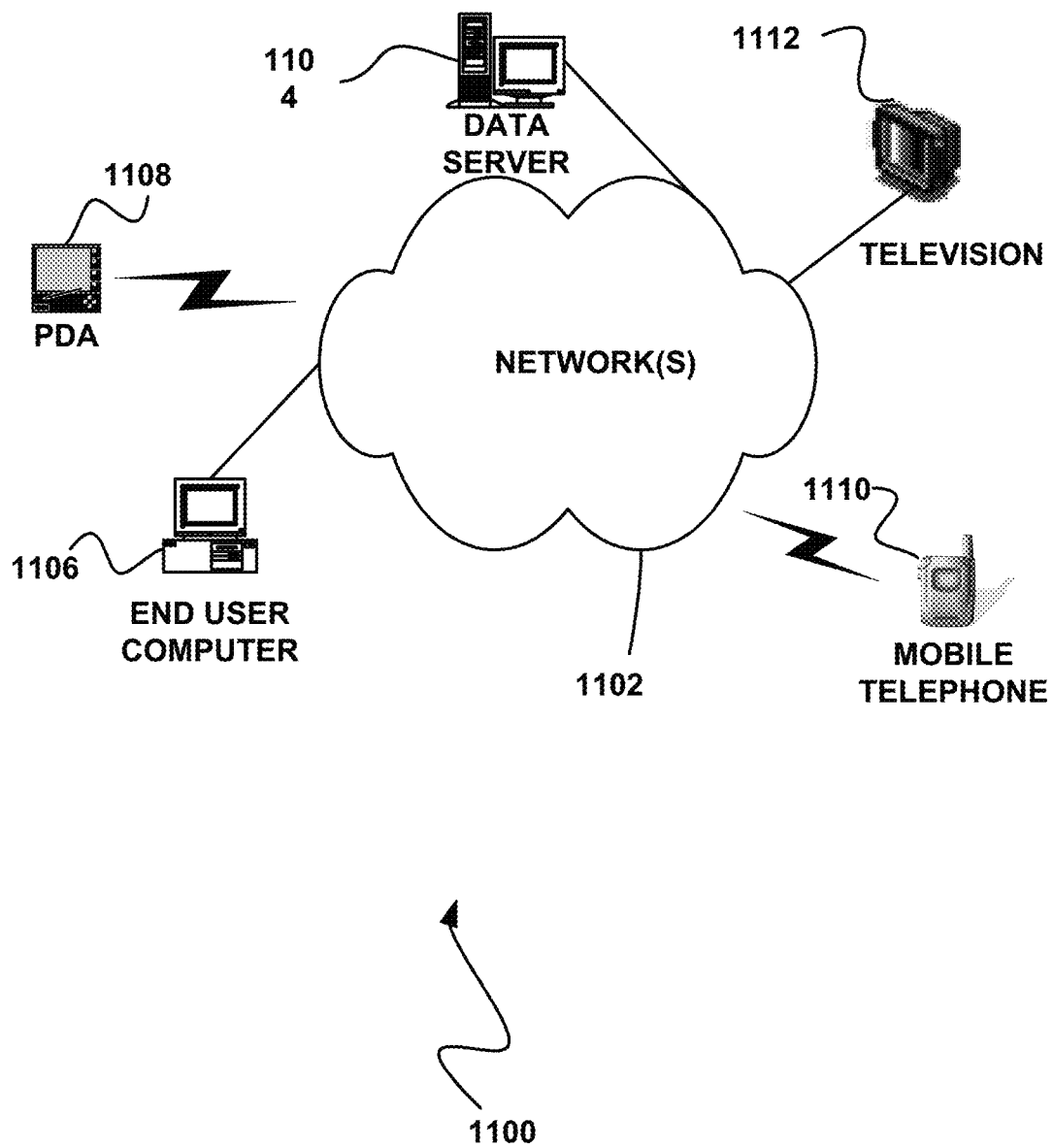
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
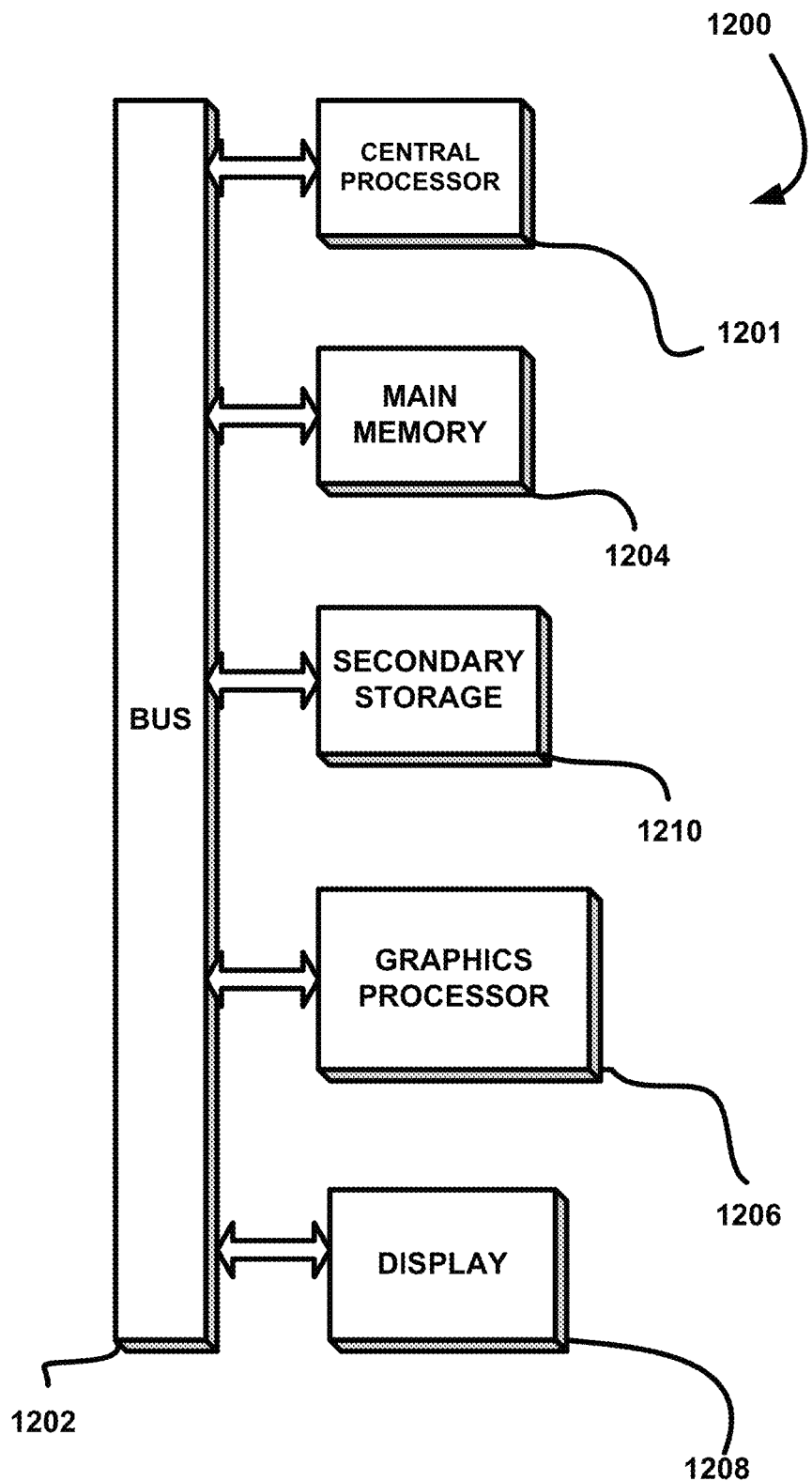
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   interfacing, by an infrastructure inventory layer of a system, a plurality of cloud management systems that each manage respective groups of resources within a network, the resources including at least virtual machines and storage;
   subscribing, by the infrastructure inventory layer of the system, to pre-defined inventory information within a local database of each cloud management system of the plurality of the cloud management systems, the pre-defined inventory information within the local database of the cloud management system including a current status of available and allocated resources within the respective group of resources managed by the cloud management system,
   wherein, for the subscribing, the infrastructure inventory layer defines a plurality of percentages of resource availability upon which each local database of each cloud management system of the plurality of the cloud management systems is to push the pre-defined inventory information stored in the local database to the infrastructure inventory layer, the plurality of percentages being defined by the infrastructure inventory layer to balance between latency and data accuracy,
   wherein upon resource availability of one of the cloud management systems falling below a defined percentage of the plurality of percentages, the local database of the one of the cloud management systems pushes the pre-defined inventory information stored in the local database to the infrastructure inventory layer;
   storing, by the infrastructure inventory layer of the system, the pre-defined inventory information received from the local databases of the plurality of the cloud management systems;
   identifying, by an orchestrator of the system, an order associated with a customer, the order being for a service within a network;
   responsive to identifying the order, decomposing, by the orchestrator of the system, the service into one or more resources;
   querying, by the orchestrator of the system, the infrastructure inventory layer to determine that the one or more of the resources within the network are available;
   allocating, by the orchestrator of the system, the one or more of the resources within the network to the customer by initiating, configuring, activating and connecting the one or more of the resources within the network, and marking the one or more of the resources within the network as allocated;
   updating, by the orchestrator of the system, a service inventory layer based on the allocation of the one or more of the resources within the network, including storing information indicating the order, indicating the customer, and including within the infrastructure inventory layer a link to the one or more of the resources within the network;
   wherein a local inventory repository manages and keeps real-time full inventory details for all inventory items within an associated data center including individual processor usage and availability and storage availability for each device, and wherein an aggregated inventory repository associated with a region that includes the data center maintains aggregated and summarized inventory information including type of service and total available processor.

2. The method of claim 1, wherein the infrastructure inventory layer and the service inventory layer are part of an inventory module.

3. The method of claim 1, wherein allocating the one or more of the resources within the network to the customer includes executing an activation plan that initiates, configures, activates, and connects the resources on the network.

4. The method of claim 1, wherein the resources further include compute resources and network resources.

5. A computer program product embodied on a non-transitory computer readable medium, comprising:

computer code for interfacing, by an infrastructure inventory layer of a system, a plurality of cloud management systems that each manage respective groups of resources within a network, the resources including at least virtual machines and storage;

computer code for subscribing, by the infrastructure inventory layer of the system, to pre-defined inventory information within a local database of each cloud management system of the plurality of the cloud management systems, the pre-defined inventory information within the local database of the cloud management system including a current status of available and allocated resources within the respective group of resources managed by the cloud management system, wherein, for the subscribing, the infrastructure inventory layer defines a plurality of percentages of resource availability upon which each local database of each cloud management system of the plurality of the cloud management systems is to push the pre-defined inventory information stored in the local database to the infrastructure inventory layer, the plurality of percentages being defined by the infrastructure inventory layer to balance between latency and data accuracy, wherein upon resource availability of one of the cloud management systems falling below a defined percentage of the plurality of percentages, the local database of the one of the cloud management systems pushes the pre-defined inventory information stored in the local database to the infrastructure inventory layer;

computer code for storing, by the infrastructure inventory layer of the system, the pre-defined inventory information received from the local databases of the plurality of the cloud management systems;

computer code for identifying, by an orchestrator of the system, an order associated with a customer, the order being for a service within a network;

computer code for, responsive to identifying the order, decomposing, by the orchestrator of the system, the service into one or more resources;

computer code for querying, by the orchestrator of the system, the infrastructure inventory layer to determine that the one or more of the resources within the network are available;

computer code for allocating, by the orchestrator of the system, the one or more of the resources within the network to the customer by initiating, configuring, activating and connecting the one or more of the resources within the network, and marking the one or more of the resources within the network as allocated;

computer code for updating, by the orchestrator of the system, a service inventory layer based on the allocation of the one or more of the resources within the network, including storing information indicating the order, indicating the customer, and including within the infrastructure inventory layer a link to the one or more of the resources within the network;

wherein a local inventory repository manages and keeps real-time full inventory details for all inventory items within an associated data center including individual processor usage and availability and storage availability for each device, and wherein an aggregated inventory repository associated with a region that includes the data center maintains aggregated and summarized inventory information including type of service and total available processor.

6. A system comprising:

a memory system; and one or more processing cores coupled to the memory system and that are each configured to:

interface, by an infrastructure inventory layer of the system, a plurality of cloud management systems that each manage respective groups of resources within a network, the resources including at least virtual machines and storage;

subscribe, by the infrastructure inventory layer of the system, to pre-defined inventory information within a local database of each cloud management system of the plurality of the cloud management systems, the pre-defined inventory information within the local database of the cloud management system including a current status of available and allocated resources within the respective group of resources managed by the cloud management system, wherein, for the subscribing, the infrastructure inventory layer defines a plurality of percentages of resource availability upon which each local database of each cloud management system of the plurality of the cloud management systems is to push the pre-defined inventory information stored in the local database to the infrastructure inventory layer, the plurality of percentages being defined by the infrastructure inventory layer to balance between latency and data accuracy, wherein upon resource availability of one of the cloud management systems falling below a defined percentage of the plurality of percentages, the local database of the one of the cloud management systems pushes the pre-defined inventory information stored in the local database to the infrastructure inventory layer;

store, by the infrastructure inventory layer of the system, the pre-defined inventory information received from the local databases of the plurality of the cloud management systems;

identify, by an orchestrator of the system, an order associated with a customer, the order being for a service within a network;

responsive to identifying the order, decompose, by the orchestrator of the system, the service into one or more resources;

query, by the orchestrator of the system, the infrastructure inventory layer to determine that the one or more of the resources within the network are available;

allocate, by the orchestrator of the system, the one or more of the resources within the network to the customer by initiating, configuring, activating and connecting the one or more of the resources within the network, and marking the one or more of the resources within the network as allocated;

update, by the orchestrator of the system, a service inventory layer based on the allocation of the one or more of the resources within the network, including storing information indicating the order, indicating the customer, and including within the infrastructure inventory layer a link to the one or more of the resources within the network;

wherein a local inventory repository manages and keeps real-time full inventory details for all inventory items within an associated data center including individual processor usage and availability and storage availability for each device, and wherein an aggregated inventory repository associated with a region that includes the data center maintains aggregated and summarized inventory information including type of service and total available processor.

* * * * *